United States Patent [19]
Tsuda

[11] 3,767,512
[45] Oct. 23, 1973

[54] APPARATUS FOR HEAT SEALING THE OVERLAPPED ENDS OF A THERMOPLASTIC BAND

[75] Inventor: Okihiko Tsuda, Kawasaki, Japan
[73] Assignee: Ikegai Tekko Kabushiki Kaisha, Tokyo, Japan
[22] Filed: Sept. 23, 1971
[21] Appl. No.: 183,051

[30] Foreign Application Priority Data
Sept. 28, 1970 Japan.................................. 45/96231

[52] U.S. Cl.................. 156/502, 156/513, 156/581, 156/253
[51] Int. Cl...... B31f 5/00, B65h 21/00, B32b 31/18
[58] Field of Search..................... 156/251, 253, 502, 156/510, 513, 157, 581, 252

[56] References Cited
UNITED STATES PATENTS
3,013,930   12/1961   Serbin................................. 156/581
3,032,454   5/1962   Rohdin ............................... 156/581
3,113,899   12/1963   Hoag et al. ...................... 156/518 X
2,912,746   11/1959   Oshry et al. ..................... 156/251 X
3,115,564   12/1963   Stacy ............................... 156/251 X Primary Examiner—Philip Dier
Attorney—Woodhams, Blanchard & Flynn

[57] ABSTRACT

A device for working a heat plate having plural blades disposed in parallel with one another thereon for use in an apparatus for welding a thermoplastic band through melting of the overlapped portions of said band by virtue of the pressing of said blades against it, wherein: a heat plate pivoted by a guide pin on a guide frame in slidable and rotatable fashion and having a stopper is provided in slidable fashion on a slide plate mounted on the guide frame slidably and engaged with an adjusting stopper provided on said guide frame; and a cam mechanism to rotate said heat plate so as to make its tip go down by virtue of the sliding movement of said slide plate after said adjusting stopper has been engaged with said guide pin to thereby stop the heat plate.

8 Claims, 13 Drawing Figures

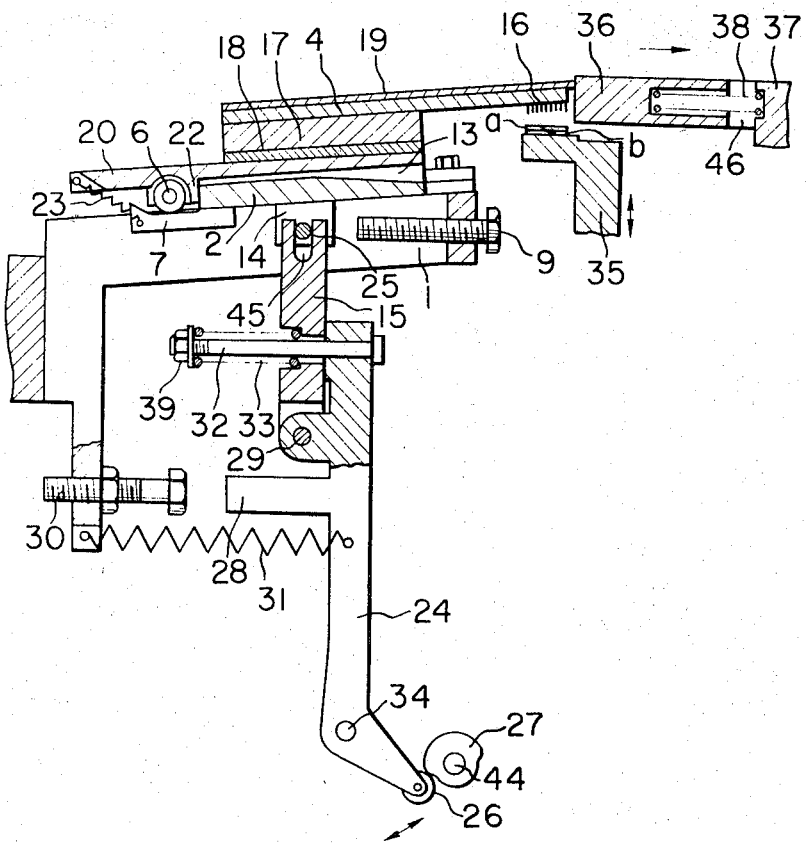
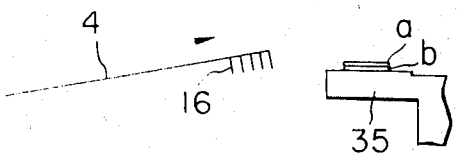
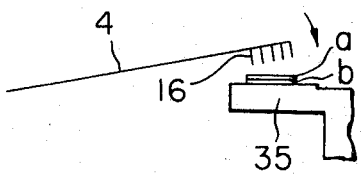

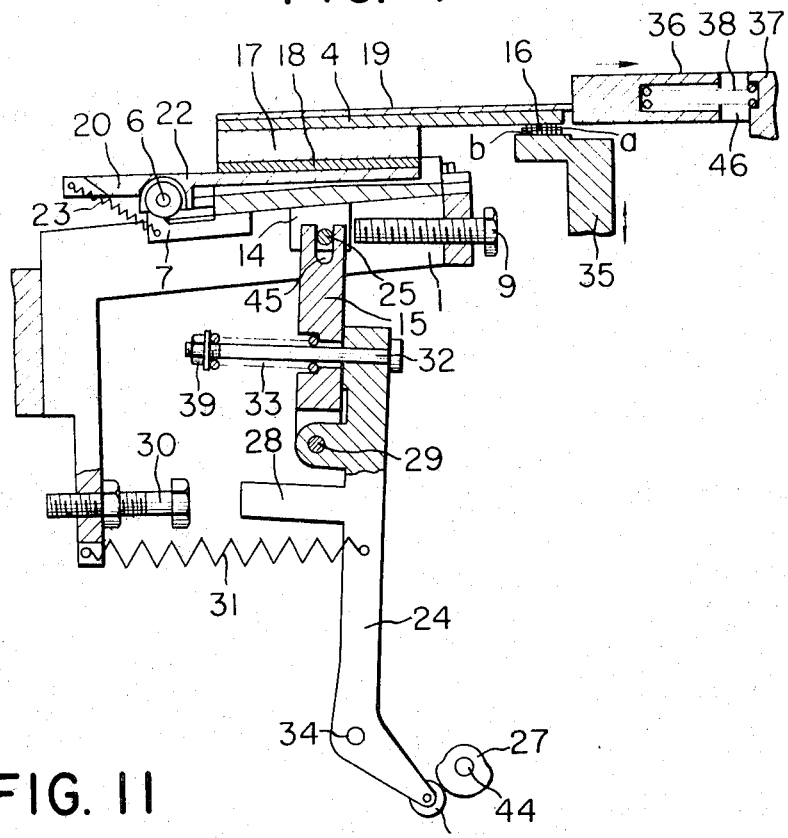
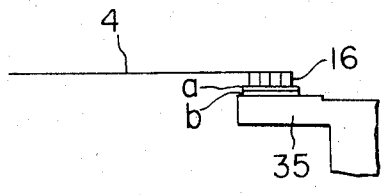
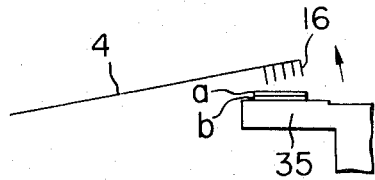
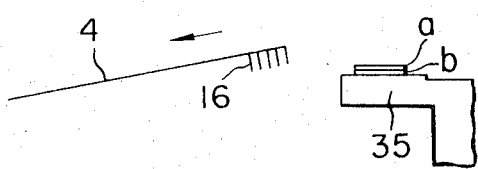

APPARATUS FOR HEAT SEALING THE OVERLAPPED ENDS OF A THERMOPLASTIC BAND

BACKGROUND OF THE INVENTION

1. Field of the Invention

The present invention relates to a device for working a heat plate for the purpose of melting a strapping band by heating, which is applicable to a packing machine for strapping packages by the use of a strapping band consisting of thermoplastic material such as polypropylene.

2. Description of the Prior Art

As for the conventional devices of this kind, such a device as designed to fling down a heat plate having plural blades provided on the bottom thereof and disposed parallel to the direction of strain of the strapping band against said band by virtue of an inclined cam has heretofore been proposed. But, such a conventional device has been defective in that the blades occasionally bite the band aslant, resulting in not only failure in obtaining a stable and secure welding portion but also such troubles as hitching of the band on the blade, damage of the blade per se, etc. owing to the slantwise movement of the blade.

SUMMARY OF THE INVENTION

One object of the present invention is to provide a device for working a heat plate for use in packing machine, which eliminates the foregoing shortcomings of conventional devices of this kind, thrusts the blades against the band exactly at a right angle, and thereby not only ensures a stable and secure welding portion but also minimizes the risk of damaging the blades.

Another object of the present invention is to provide a device for working a heat plate for use in a packing machine, which renders it possible to adjust the stroke of the blades of the heat plate and readily arrange the position of the blades in relation to the band appropriately.

Still another object of the present invention is to provide a device for working a heat plate for use in a packing machine, which ensures a stable and secure welding portion as a result of melting the overlapped portions by making the blades of the heat plate penetrate the overlying band to eat into the underlying band halfway.

BRIEF DESCRIPTION OF THE DRAWINGS

Among the appended drawings,

FIG. 3 is a schematic representation of a sectional view of the same device as in FIG. 2 taken along the line III—III therein, wherein the state of the heat plate as located right above the band is shown.

FIG. 4 is a schematic representation of sectional view of the same device as in FIG. 2 taken along the line III—III therein, wherein the state of the heat plate whose blades have been thrust into the band is shown.

FIGS. 9 to 13 are illustrations to explain the order of movements of the heat plate in relation to the band.

DETAILED DESCRIPTION OF THE INVENTION

Figure 1:
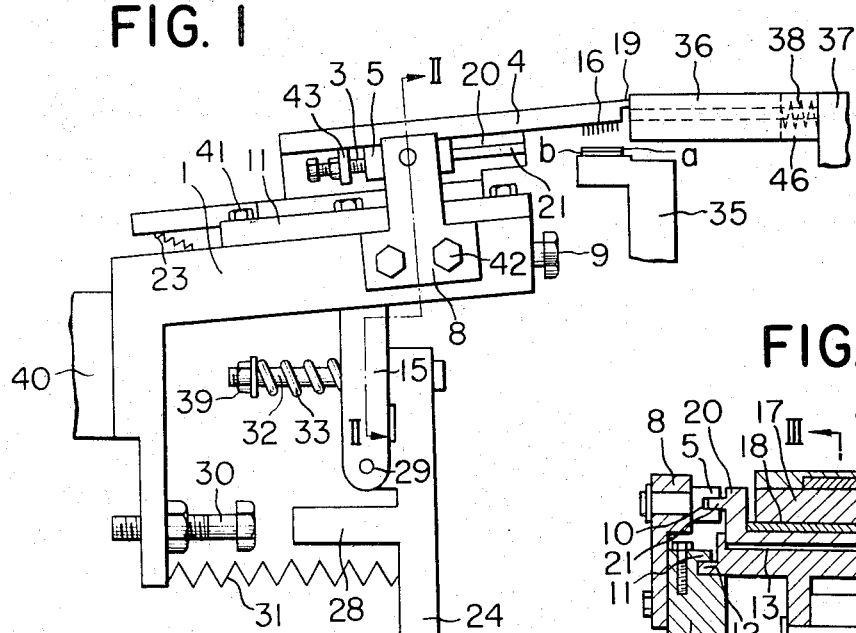
FIG. 1 is a schematic representation of a front view of a device for working a heat plate according to the present invention.
Figure 2:
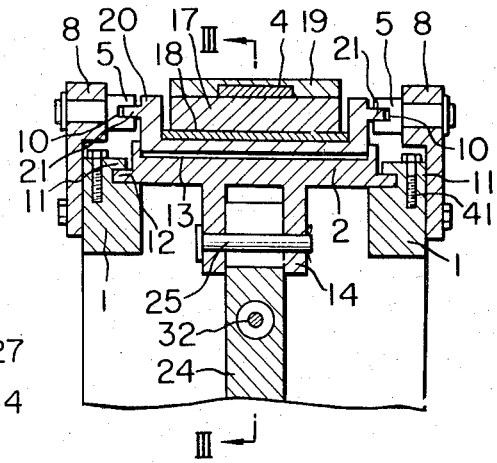
FIG. 2 is a schematic representation of sectional view of the same device as in FIG. 1 taken along the line II—II therein.
Figure 5:
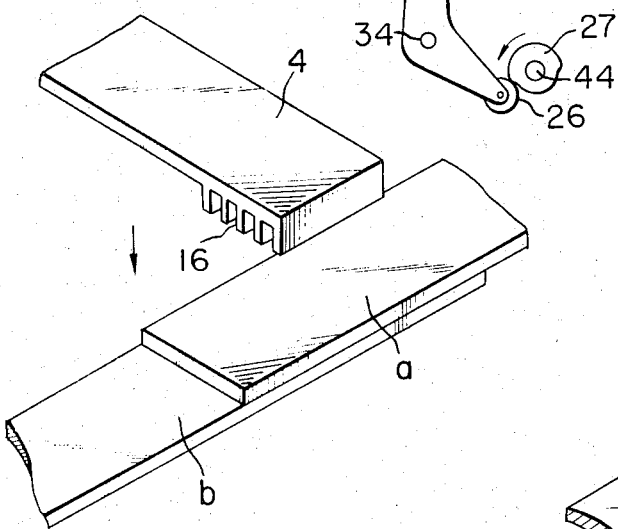
FIG. 5 is a fragmental perspective view, on an enlarged scale, of the heat plate and the band in FIG. 3 for the purpose of showing the relative positions thereof.
Figure 7:
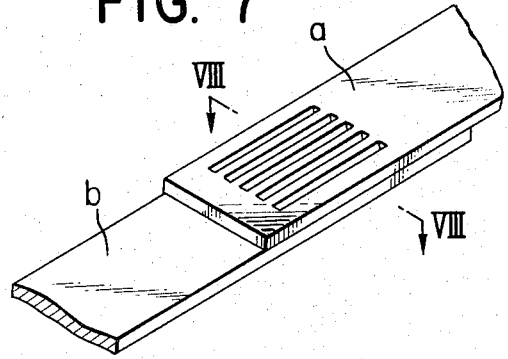
FIG. 7 is a fragmental perspective view, on an enlarged scale, of the welding portion of the band after welding.

In FIGS. 1 and 2, the numeral reference 1 denotes the guide frame fixed on the frame portion 40 of the strapping machine, said guide frame 1 being provided with the guide plate 11 fixed on the top thereof by the bolt 41, the brackets 8 fixed on the both sides thereof by the bolt 42 respectively, and the stopper bolts 9 and 30 screwed respectively into the front end and the lower end portion thereof. The bracket 8 is provided with the guide pin 5 having the slot 10 and fitted in the upper end portion thereof.

The lug 12 projecting from the lower slide plate 2 slidably fits in the confronting grooved portion of the guide plate 11, and on the upper side of this slide plate 2, there is provided the grooved portion 13 whose fore part inclines downwards. The bottom of the upper slide plate 20 slidably fits in this grooved portion 13, and the lug 21 projecting from the upper portion of the side wall of this slide plate 20 fits slidably in the foregoing slot 10. The heater 17 is mounted on the upper side of this slide plate 20 through the adiabatic plate 18 interposed therebetween, and the heat plate 4 mounted on this heater 17 is fixed by means of the holding plate 19 whose end sticks out beyond the end of the heat plate 4. The fore bottom of the heat plate 4 is provided with plural blades 16 disposed parallel with one another. Near the rear end of the holding plate 19, there is provided the bracket 43 in which the stopper bolt 3 is screwed, and this bolt 3 confronts the guide pin 5. The cam roller 6 (FIG. 3) is pivoted on the projected portion 22 provided on the rear bottom of the upper slide plate 20, and this projected portion 22 confronts the rear end of the lower slide plate 2. The cam plate 7 is fixed on this lower slide plate 2 so as to confront said cam roller 6, and the cam roller 6 rides on the cam plate 7. Between the rear end of the upper slide plate 20 and the cam plate 7, there is installed the spring 23 which always draws the slide plate 20 towards the slide plate 2. The bracket 14 projects from about the center of the bottom of the slide plate 20, and the pin 25 is installed on this bracket 14.

Referring also to FIG. 3, the shaft 34 is installed on the frame not shown therein, and the slot 45 provided on the upper end of the arm 15 pivoted on the upper part of the lever 24 pivoted on said shaft 34 by means of the pin 29 receives the aforesaid pin 25. The arm 15 and the lever 24 are provided with a concentric hold through which the guide rod 32 runs. The portion between the nut 39 screwed on the end of said guide rod 32 and the receiving hole piercing the arm 15 is coiled by the spring 33 which constantly biases the arm 15 toward the lever 24. The lever 24 is provided with the projecting rod 28 which confronts the stopper bolt 30. Between the lower end of the guide frame 1 and the lever 24, there is installed the spring 31 which constantly draws the lever 24 toward the lower end of the guide frame 1. On the lower end of the lever 24 is pivoted the cam roller 26 which is constantly engaged with the cam 27 fixed on the shaft 44 pivoted on the frame, and this cam 27 is to be rotated by a driving gear not shown herein.

The frame not shown herein is provided with the press member 35 capable of vertical movement by virtue of an operation mechanism not shown herein. Above the press member 35, there is provided the movable table 36 in transversely movable fashion, said table having a transversely projecting guide plate which fits slidably in the groove provided on the guide plate 46 fixed on the frame. Between this table 36 and the confronting fixed table 37, there is installed the spring 38 which constantly presses the movable table 36 transversely.

OPERATION

Immediately before starting the melting work, the cam roller 26 of the lever 24 is engaged with the dent of the cam 27, the heat plate 4 is located to the left of the press member 35 as shown in FIG. 9, the press member 35 is in the elevated position, and the overlap portions a and b of the band to be welded ride on the elevated press member 35.

Under such circumstances, with the rotation of the cam 27, the lever 24 together with the arm 15 fixed thereon turns clockwise centering around the shaft 34. By virtue of this movement, the lower slide plate 2 advances to the right in the drawing along the upper side of the guide plate 1 through the pin 25 engaged with the slot 45 provided on the top of the arm 15. With this advance of the lower slide plate 2, the upper slide plate 20—which is mounted on the lower slide plate 2 and connected with the cam plate 7 united with said slide plate 2 through the medium of the spring 23—advances together with the heat plate 4 installed thereon. By virtue of this advance, the tip of the heat plate 4 gets engaged with the movable table 36, and the movable table 36 is made to retreat from the position above the overlap portions a and b of the band in opposition to the pressure by the spring 38. Thus, when the blades 16 of the heat plate 4 have come to the position above the overlap portions a and b of the band, the stopper bolt 3 gets engaged with the guide pin 5 and stops, whereby the heat plate 4 together with the upper slide plate 20 stop (cf. FIGS. 1, 3 and 10).

Figure 6:
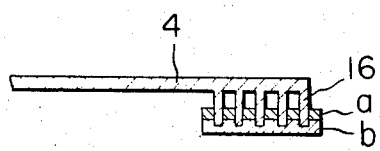
FIG. 6 is a fragmental sectional view, on an enlarged scale, of the heat plate and the band in FIG. 4 for the purpose of showing the relative positions thereof.
Figure 8:
FIG. 8 is a sectional view taken along the line VIII—VIII in FIG. 7.

Meanwhile, the lever 24 continues working and the lower slide plate 2 keeps advancing, so that the cam plate 7 fixed on the lower slide plate 2 advances to thereby shift the cam roller 6 provided on the upper slide plate 20 in abeyance to the height of the cam plate 7, and, as a result, the upper slide plate 20 turns clockwise centering around the guide pin 5, the blades 16 of the heat plate 4 gradually descend to eat into the overlapped portions a and b of the band as shown in FIGS. 4 and 11 and simultaneously start melting the band. When the blades 16 have eaten into the underlying portion b of the band while melting it short of penetration as shown in FIG. 6, the bracket 14 of the lower slide plate 2 gets engaged with the stopper bolt 9 screwed into the fore end of the guide frame 1, whereby the lower slide plate 2 stops and the ascent of the blades 16 also stops (cf. FIG. 11).

At this juncture, the cam roller 26 of the lever 24 gets engaged with the dent of the rotating cam 27, and, by virtue of the tension of the spring 31, the lever 24 starts working counterclockwise, whereby the lower slide plate 2 retreats to the left in the drawing. By virtue of this backward movement of the lower slide plate 2, the cam roller 6 shifts to the lower portion of the cam plate 7 to thereby elevate the blades 16 of the heat plate 4 and pull out them from the overlapped portions a and b of the band (cf. FIG. 12).

In this wake, the lower slide plate 2 retreats as the lever 24 turns, and its rear end gets engaged with the projected portion 22 of the upper slide plate 20, whereby both the upper slide plate 20 and the lower slide plate 2 retreat (cf. FIG. 13).

On this occasion, the movable table 36 contacting with the holding plate 19 advances by virtue of the pressing force of the spring 38 as the heat plate 4 retreats, and comes to be located above the overlapped portions a and b of the band. At this juncture, the press member 35 under the band ascends, and, by virtue of the hold of the melted overlapped portions a and b the band is pressed between the movable table 36 and the press member 35.

At the time of the foregoing operation, the transverse stroke of the heat plate 4 can be modified by adjusting the position of the stopper bolt 3, the vertical stroke thereof can be modified by adjusting the position of the stopper bolt 9, and the thrusting force of the blades 16 of the heat plate 4 against the overlapped portions a and b of the band can be modified by adjusting the position of the nut 39 screwed on the guide rod 32.

Although particular preferred embodiments of the invention have been disclosed hereinabove for the purpose of illustration, it will be understood that variations or modications thereof which lie within the scope of the invention as defined by the appended claims are fully contemplated.

I claim:

1. An apparatus for heat sealing the overlapping portions of a thermoplastic band, comprising:

frame means including a guide portion;

first slide means slidably mounted on said guide portion, and stop means coacting between said frame means and said first slide means when said first slide means is in an end position to limit the movement of said slide means;

second slide means positioned adjacent said first slide means and movable relative thereto;

heat sealing means fixedly mounted on said second slide means for movement therewith, said heat sealing means including a plurality of substantially parallel blades disposed for at least partially penetrating and melting the overlapping portions of said band for welding said overlapping portions together;

operating means drivingly connected to said first slide means for causing slidable movement thereof toward and away from said end position; and means coacting with said second slide means for permitting both slidable and pivotal movement of said second slide means relative to said first slide means as said first slide means is moved toward said end position for causing said blades to be moved into a position directly adjacent said overlapping portions of said band and then moved into said overlapping portions for penetrating and melting same.

2. An apparatus according to claim 1, wherein said means coacting with said second slide means includes mounting means connected between said frame means and said second slide means for permitting both linear slidable and pivotal movement of said second slide means relative to said frame means, said means coacting with said second slide means further including cam means coacting between said first and second slide means for causing pivotal movement of said second slide means relative to said frame means in response to relative slidable movement between said first and second slide means.

3. An apparatus according to claim 2, wherein said operating means linearly slidably moves said first slide means between said first-mentioned end position and a second end position, said second slide means being movable with said first slide means from said second end position to a third position disposed intermediate said end positions, and stop means coacting between said second slide means and said frame means for preventing movement of said second slide means beyond said third position toward said first-mentioned end position, said cam means causing pivotal movement of said second slide means as said first slide means is moved from said third position toward said first-mentioned end position.

4. An apparatus according to claim 3, wherein said mounting means includes pivot pin means coacting between said second slide means and said frame means for permitting relative pivotal movement therebetween, said pivot pin means and said second slide means having cooperating elongated guide means formed thereon for permitting said second slide means to be linearly displaced relative to said pivot means in a direction substantially perpendicular to the rotational axis defined by said pivot means.

5. An apparatus according to claim 3, wherein said cam means includes a cam plate formed on one of said first and second slide means and a cam roller disposed on the other of said first and second slide means, said cam roller being disposed for engagement with said cam plate only when said first slide means is moved beyond said third position toward said first-mentioned end position.

6. An apparatus according to claim 3, wherein said operating means includes lever means pivotally mounted on said frame means for swinging movement about a first pivot axis, said lever means being pivotally and drivingly connected to said first slide means at a location spaced from said pivot axis, and driving rotatable cam meams disposed in engagement with said lever means for controlling the swinging movement thereof.

7. An apparatus according to claim 1, wherein said first and second slide means are linearly movable in a direction substantially perpendicular to the elongated direction of said band, and said second slide means being pivotable about an axis which is substantially perpendicular to said direction of linear movement, said pivot axis also being substantially parallel to the elongated direction of the overlapping portions of said band.

8. An apparatus according to claim 7, wherein the parallel blades on said sealing means extend in a direction which is substantially parallel to the elongated direction of the overlapping portions of said band.

* * * * *